(No Model.)

I. N. KENDALL & G. CASSADY.
CURVED SAW TOOTH.

No. 499,886. Patented June 20, 1893.

Witnesses
B. S. Ob...
Chas. S. Hyer

By their Attorneys,
C. A. Snow & Co.

Inventors;
Isaac N. Kendall
George Cassady.

UNITED STATES PATENT OFFICE.

ISAAC NEWTON KENDALL AND GEORGE CASSADY, OF VANCOUVER, CANADA.

CURVED SAW-TOOTH.

SPECIFICATION forming part of Letters Patent No. 499,886, dated June 20, 1893.

Application filed July 30, 1892. Serial No. 441,745. (No model.)

*To all whom it may concern:*

Be it known that we, ISAAC NEWTON KENDALL and GEORGE CASSADY, subjects of the Queen of Great Britain, residing at Vancouver, Province of British Columbia, Canada, have invented a new and useful Improvement in Curved Saw-Teeth, of which the following is a specification.

This invention relates to certain new and useful improvements in saw teeth and especially to the manner of applying the same, and has for its object to securely hold a saw tooth in the blade of a band saw as well as other forms of saws, and with this object in view the invention consists of the construction and arrangement of parts as will be more fully hereinafter described and claimed.

Figure 1:
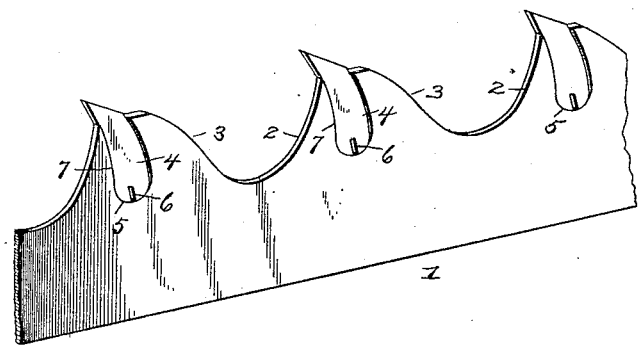
Figure 2:
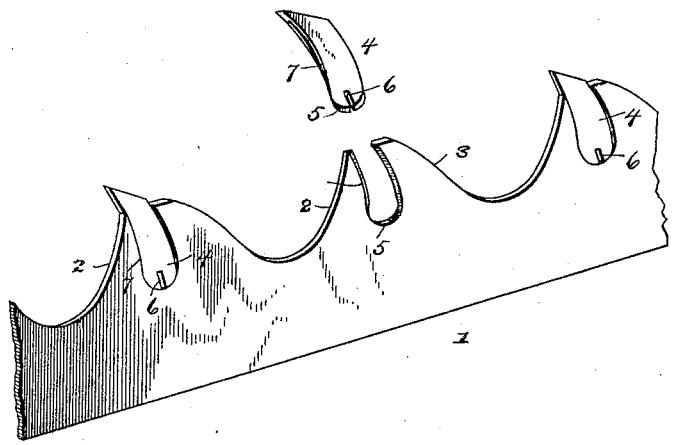

In the drawings:—Figure 1 is a perspective view of a portion of a saw blade showing the improved manner of securing the teeth therein. Fig. 2 is a similar view with one of the teeth disconnected.

Similar numerals of reference are employed to indicate corresponding parts in the several figures.

Referring to the drawings the numeral 1 designates a saw blade having recesses or slots therein with rounded circular plain bottom walls 2, and side walls 3, of V-shaped form. The said side walls are gradually curved and arranged obliquely to the longitudinal axis of the saw blade. Each of the teeth 4, is formed with a projecting cutting point and a lower rounded plain end 5 which is slightly slotted or bifurcated as at 6, each of said teeth also having curved sides 7, with V-shaped grooves therein adapted to fit over the V-shaped walls 3, of the recesses in the blade 1. The curvature of the sides 7 of the teeth is of a slightly different radius from the side walls of the recesses to receive the same, and are thereby sprung into place when inserted and the lower end of each tooth thereby becomes locked. The bifurcation or slot in the bottom part of the teeth overcomes a tendency of expansion of the plate at the lower ends of the teeth.

The form of fastening herein is simple and effective, and is specially useful in band saws.

Having thus described the invention, what is claimed as new is—

In combination with a saw plate having recesses or slots therein with curved unbroken plain bottom walls and curved obliquely arranged side walls of V-shaped form, and teeth having curved sides of different radius from the said side walls of the recesses or slots, and lower rounded plain ends with small slots or bifurcations therein and side walls with V-shaped grooves, the said lower slots or bifurcations being unengaged and preventing expansion of the saw plate, substantially as described.

In testimony that we claim the foregoing as our own we have hereto affixed our signatures in the presence of two witnesses.

ISAAC NEWTON KENDALL.
GEORGE CASSADY.

Witnesses:
W. J. BOWSER,
A. H. MACNEILL.